GEORGE C. KENNEDY
INVENTOR.

BY
ATTORNEY

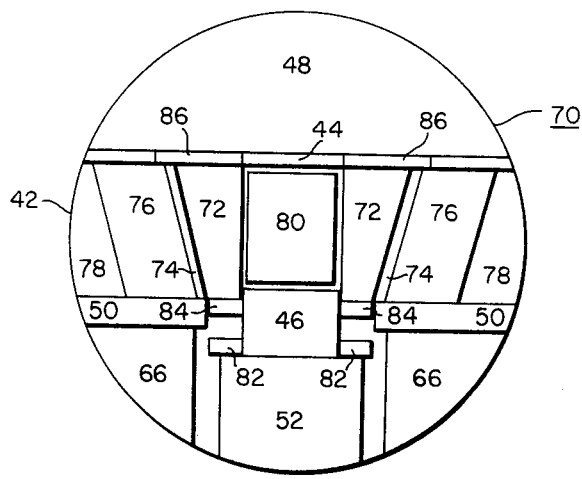
Fig. 3
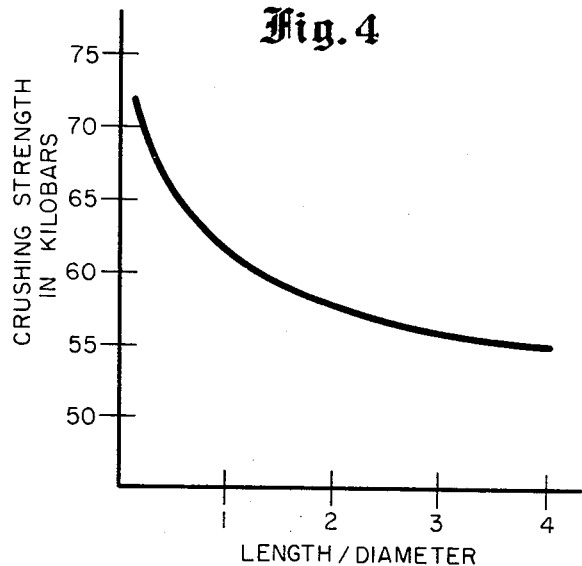
Fig. 4

July 11, 1972    G. C. KENNEDY    3,676,069
METHOD FOR MANUFACTURING DIAMONDS IN A HYDROGEN
FREE ENVIRONMENT
Filed Aug. 13, 1970    3 Sheets-Sheet 3
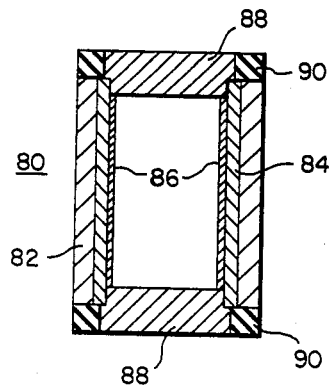
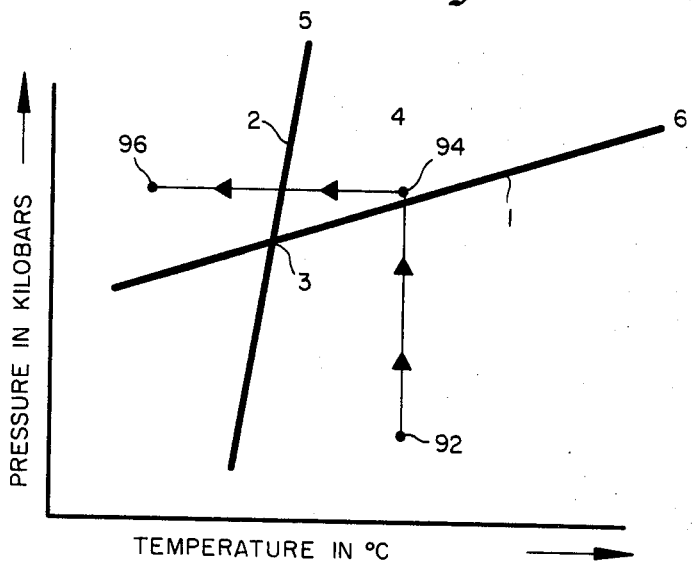
GEORGE C. KENNEDY
INVENTOR.
ATTORNEY United States Patent Office 3,676,069
Patented July 11, 1972

3,676,069
METHOD FOR MANUFACTURING DIAMONDS IN A HYDROGEN FREE ENVIRONMENT
George C. Kennedy, Los Angeles, Calif., assignor to Teledyne, Inc., Los Angeles, Calif.
Filed Aug. 13, 1970, Ser. No. 63,355
Int. Cl. C01b 31/06
U.S. Cl. 23—209.1            6 Claims

ABSTRACT OF THE DISCLOSURE

A method of manufacturing diamond from graphite in a hydrogen free environment is disclosed in which a reaction vessel is first formed from an anhydrogenous material. A charge of graphite and a carbon solvent is placed in the reaction vessel and the reaction vessel is placed in the reaction chamber. A plunger is placed in the reaction chamber to generate high pressures therein, and the relatively moving surfaces between the reaction chamber and the plunger are lubricated with an anhydrogenous lubricant. The temperature and pressure in the reaction chamber are then raised until the conditions in the reaction chamber are above the diamond-graphite equilibrium line of the carbon phase diagram and these pressure and temperature conditions are maintained for a predetermined time period until at least a portion of the graphite in the charge is converted to diamond.

BACKGROUND OF THE INVENTION

This invention relates to diamond making and more particularly to an improved method for manufacturing diamonds in a hydrogen-free environment.

In patent application Ser. No. 63,357 entitled Method of Manufacturing Diamonds and in patent application of Ser. No. 63,356 entitled Apparatus for Manufacturing Diamonds, both filed concurrently with this application by the present inventor and both assigned to the same assignee as this application, there is disclosed a new method for converting graphite to diamond under which much larger diamonds of much higher quality can be produced, and novel apparatus for so manufacturing diamond is disclosed.

Briefly, under these inventions and as is disclosed in detail hereinafter, graphite is converted into diamond by subjecting it to extremely high temperatures and pressure conditions under closely controlled conditions. Under these inventions, it is necessary to provide a reaction chamber capable of containing the reaction at the extremely high temperatures and pressures, and it is also necessary to provide some relatively moving surfaces which have extremely close tolerances and which, if not properly lubricated, generate substantial friction there between. It was discovered, for reasons not theoretically understood, that the graphite-to-diamond conversion was very difficult, if not impossible to effect if any hydrogen or hydrogen containing materials are present in the reaction chamber.

In the prior art, hydrogen has been found in cylinder-piston high pressure apparatus of the type generally described below in two places. First, the reaction vessel has frequently been formed from a salt containing water of crystallization, such as talc. Second, hydrocarbon lubricants have been used between the relatively moving surfaces of the piston and the cylinder walls.

OBJECTS OF THE INVENTION

It is accordingly an object of the present invention to provide an improved method for converting graphite to diamond.

It is yet another object of the present invention to provide an improved method for converting graphite to diamond in a hydrogen free environment.

It is still another object of the present invention to provide an improved method for converting graphite to diamond in which reproducible results can consistently be obtained.

BRIEF DESCRIPTION OF THE INVENTION

Briefly stated, and in accordance with the presently preferred embodiment of the invention, a method of manufacturing diamond from graphite in a hydrogen free environment is provided in which a reaction vessel is formed from an anhydrogenous material. A charge of graphite to be converted to diamond and a carbon solvent are placed in the reaction vessel and the reaction vessel is placed in a reaction chamber. A plunger is placed in the reaction chamber to generate high pressures therein, and the relatively moving surfaces of the reaction chamber and the plunger are lubricated with an anhydrogenous lubricant. The temperature and pressure in the reaction chamber are then increased until the conditions in the reaction chamber are above the diamond-graphite equilibrium line of the carbon phase diagram, and these pressure and temperature conditions are maintained for a predetermined time period until at least a portion of the graphite in the charge is converted to diamond.

BRIEF DESCRIPTION OF THE DRAWINGS

A complete understanding of the invention, together with an appreciation of all objects and advantages thereof, may be seen by reference to the attached drawings, in which:

FIG. 3 is a cross-sectional view of a detail of the high-temperature high-pressure reaction chamber of the apparatus of FIG. 2;

FIG. 4 is a graphic representation of the crushing strength of the piston of FIGS. 2 and 3 as a function of the ratio of the length to the diameter of the piston;

FIG. 5 is a cross sectional view of the high-temperature high-pressure reaction vessel of FIGS. 4 and 5; and FIG. 6 shows another phase diagram for carbon and illustrates one method under which graphite may be converted to diamond in accordance with the present invention.

DETAILED DESCRIPTION OF THE DRAWINGS

Before considering in detail the specific manner in which the present invention provides larger and higher quality man-made diamonds, it will be useful to consider in the generic sense what operations must be performed upon graphite to convert it into diamond. As is well known, both graphite and diamond are carbon, but carbon whose atoms are arranged in a different crystalline form. At atmosphere temperatures and pressures, graphite exists in its stable state and diamond exists in its metastable state. Further at extremely high temperatures and pressures, carbon can exist in the stable state in only one or the other form, depending upon the particular temperature and pressure. Generally speaking, for a given high temperature, at higher pressures diamond is the stable state of carbon and at lower pressures graphite is the stable state. Conversely, for a given high pressure, at higher temperatures graphite is the stable state of carbon and at lower temperatures, diamond is the stable state.

It is noted that when the term "graphite" is used in the specification and claims, it is not necessarily intended to be construed strictly, but is intended to mean any form of carbon other than diamond, regardless of its crystalline form.

Figure 1:
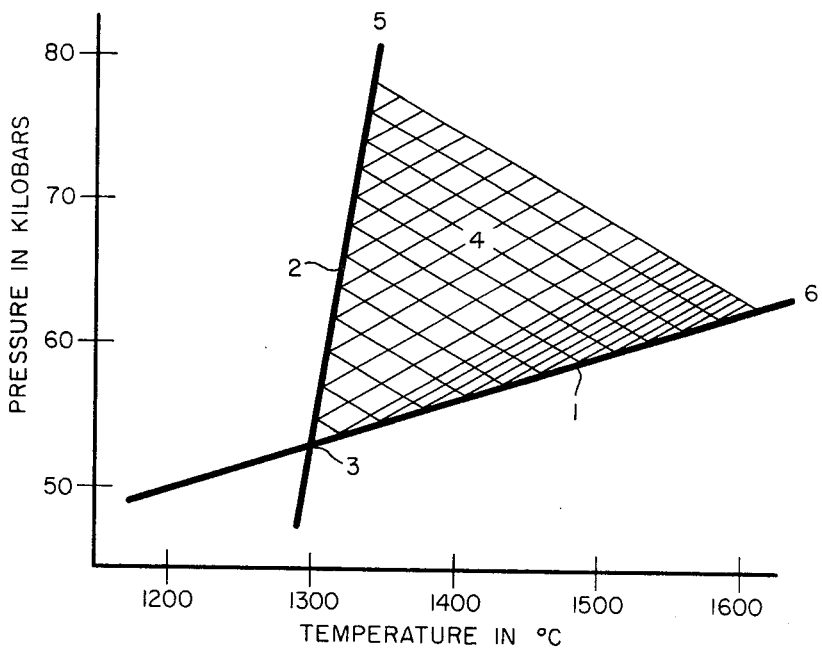
FIG. 1 shows the pressure-temperature phase diagram for carbon and illustrates the conditions under which carbon can exist in the diamond state and in the graphite state.

FIG. 1 shows graphically the pressure-temperature phase diagram of carbon, with pressure shown in kilobars and temperature in degree centigrade. The line 1 represents the diamond-graphite equilibrium line between the diamond stable field and the graphite stable field. The diamond stable field is that portion of the plot above equilibrium line 1. The graphite stable field is the portion of the plot below equilibrium line 1. The general position of the equilibrium line 1 has been known in the prior art, with its location being both computed and also measured experimentally. For example, the location of the line is reported by R. Berman and F. Simon in Zeitschrift fur Elektrochemic, 59,333 (1955). However, some of the experimental results which have been reported have erred considerably on the high-pressure side.

In view of the known location of the equilibrium line 1, it would seem that the conversion of graphite to diamond would be a simple enough process. All that is necessary is to subject the graphite to a combination of pressure and temperature lying above the equilibrium line 1, and the conversion would be naturally effected. However, in practice obviously the conversion has not been that simple. First, the pressures and temperatures shown in FIG. 1 which lie above the equilibrium line 1 are extremely high pressures and temperatures and it is difficult to design and operate suitable apparatus for containing reactions occurring at these temperatures and pressures. Next, the mere measurement of pressures and temperatures of these great magnitudes is quite difficult, so it is difficult to know when the proper conditions for the diamond conversion are being obtained. Third, even if suitable apparatus for effecting the conversion is designed and even if the conditions are being accurately monitored so that desired pressures and temperatures can be achieved, it is not sufficient just to apply any combination of temperature and pressure lying above equilibrium line 1. In order to achieve optimum conversion of graphite into large diamond crystals free of inclusions, or small particles of foreign matter, it is necessary to subject the graphite to the proper combination of pressure and temperature. If excess pressures and temperatures are applied, the result is the conversion of graphite to diamond, true enough, but what is obtained is hundreds of very tiny diamond crystals containing many inclusions, which is obviously not as desirable as converting the same charge of graphite into a much smaller number of much larger diamond crystals which are free of such inclusions. Fourth, experience has shown that it is not sufficient just to subject pure graphite to the necessary pressure and temperature conditions. The graphite must be mixed with a suitable substance before diamond conversion occurs, even if the proper temperature and pressure conditions are applied.

It was this fourth problem which led many of the prior art investigators astray. They assumed that since some carrier material had to be present which did not itself appear to enter into the reaction, this carrier material was a catalyst. The prior art reports many such "catalysts." For example, in U.S. Pat. No. 2,947,610, Hall, et al., it is reported that a suitable catalyst material for converting graphite to diamond can be selected from the class consisting of iron, cobalt, nickel, rhodium, ruthenium, palladium, osmium, iridium, chromium, tantalum and manganese. In U.S. Pat. No. 2,947,609, Strong, it is reported that the catalyst can be an alloy whose components are selected from the same group of metals plus platinum.

In the investigations which led to the present invention, it was observed that all of the so-called "catalysts" have one physical property in common. This is that all of these materials have been known for many years to be good solvents of carbon at temperatures sufficiently high for the material to be in its liquid phase. Further investigation showed that diamond conversion could be effected in any material which would dissolve carbon well when it was in its liquid phase and that conversion could not be effected in those materials which were not good solvents of carbon. From these observations it is concluded that conversion from graphite to diamond can be effected if the following conditions are met: (1) the graphite is first mixed with a suitable quantity of material which, when the material is in its liquid phase, it is a good solvent of carbon and (2) the mixture is then subjected to temperature and pressure conditions at which the material is in its liquid phase and which lies above the equilibrium line 1 of FIG. 1. When these conditions are considered, it is seen that the so-called "catalysts" reported in the prior art have no catalytic effect whatsoever on the conversion of graphite into diamond but are instead merely suitable solvents which take graphite into solution and which precipitate diamond out of solution so that the conversion can be effected.

Now referring still to FIG. 1, the line 2 represents the plot of the melting point of a material as a function of pressure and temperature. Line 2 can be termed the solid-liquid phase boundary line. In this particular case, the phase boundary line 2 represents the boundary between the liquid and solid phase of a nickel-iron alloy having 50% nickel and 50% iron. On the left-hand side of phase boundary line 2, the alloy is in its solid phase and on the right-hand side of phase boundary line 2, the alloy is in its liquid phase. This particular alloy is known to be a good solvent of carbon when it is in its liquid phase, and thus this alloy is under the conditions described above, a good solvent for use in a graphite to diamond conversion. The point 3, which is the intersection of equilibrium line 1 and phase boundary line 2, represents the lowest temperature and pressure at which graphite can be converted into diamond when mixed with this particular solvent.

The shaded region 4 bounded by the section 5–3 of phase boundary line 2 and section 3–6 of equilibrium line 1, which may be termed the diamond growing region of the plot, represents that portion of the diamond stable field in which graphite can be converted into diamond using this particular alloy as a solvent. It is noted that for this particular solvent, the curve 5–3–6 corresponds exactly to the "catalyst" curves which define the diamond growing regions which are shown in FIG. 1 of U.S. Pat. No. 2,947,609, Strong and in FIG. 3 of U.S. Pat. No. 3,031,269, Bovenkerk, both assigned to the General Electric Company.

Figure 2:
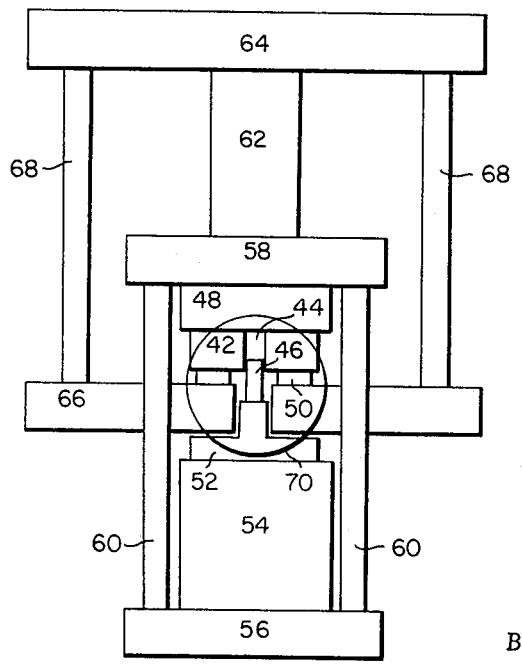
FIG. 2 is a schematic representation of high-pressure high-temperature apparatus which can be used for making diamonds in accordance with the present invention.

FIG. 2 shows a schematic representation of high-pressure apparatus 40 which may be used in accordance with the present invention to convert graphite to diamond. The apparatus 40 includes a high-pressure plate 42 which includes a cylindrical central cavity 44 which forms the reaction chamber in which the diamond conversion occurs. A cylindrical shaped piston 46 fits into reaction chamber 44. As is described in more detail below, the necessary high-pressure is generated in reaction chamber 44 by advancing piston 46 into reaction chamber 44.

High-pressure plate 42 is bounded on its upper and lower ends by upper end load plate 48 and lower end load plate 50 respectively. These end load plates support the ends of high-pressure plate 42 to prevent it from rupturing when it is under extreme pressure within reaction chamber 44. In addition, upper end load plate 48 serves to seal the top end of reaction chamber 44. Lower end load plate 50 includes a central opening through which piston 46 projects into reaction chamber 44.

The necessary forces to move piston 46 into reaction chamber 44, thereby generating the high-pressure within reaction chamber 44, are applied to piston 46 through piston pusher 52. The forces are generated in a hydraulic ram 54, shown schematically. The force cycle is closed by positioning member 56 below hydraulic ram 54 and member 58 above upper end load plate 48 and tying members 56 and 58 together with tie rods 60. Thus, when hydraulic ram 54 is actuated, piston 46 advances into reaction chamber 44 and upper end load plate 48 is held tightly over the end of reaction chamber 44, thereby generating high pressures therein.

When extremely high pressures are generated in reaction chamber 44, forces are created in high pressure plate 42 which might cause it to rupture out its ends. To prevent this, a second hydraulic ram 62 is provided having one end positioned above member 58. Another member 64 is provided above the other end of hydraulic ram 62. Yet another member 66 is provided beneath lower end load plate 50 and members 64 and 66 are tied together through tie rod 68. It is noted that member 66 includes a central opening through which piston pusher 52 contacts piston 46 and additional openings through which tie rods 60 interconnect members 56 and 58. When hydraulic ram 62 is actuated, high pressures are thus placed on the ends of high pressure plate 42 through end load plates 48 and 50 to counteract the stresses generated internally in high pressure plate 42 when high pressures are generated in reaction chamber 44.

It is noted that high pressure apparatus of the general type shown in FIG. 2 is discussed by Kennedy and LaMori in an article entitled "Some Fixed Points on the High-Pressure Scale" appearing in Progress in Very High Pressure Research, Bundy, Hibbard & Strong, Ed., J. Wiley & Sons, 1961, and in an article by Kennedy, Haygarth and Getting entitled "Determination of the Pressure of Barium I–II Transition with Single Stage Piston-Cylinder Apparatus" appearing in The Journal of Applied Physics, volume 38, No. 12, 4557–4564, November 1967.

FIG. 3 shows a cross sectional view of an enlargement of the detail 70 of FIG. 2 and illustrates certain features of the present invention which, for clarity, are not shown in FIG. 3. As shown therein, high pressure plate 42 comprises an inner pressure vessel 72 surrounded by a plurality of concentric support rings 74, 76 and 78. Pressure vessel 72 is constructed from a material capable of withstanding the highest possible pressures. Of the presently known materials, cemented tungsten carbide is preferred because of its outstanding ability to withstand compressive forces. However, tungsten carbide is quite brittle and so it is necessary to surround it with the support rings 74, 76 and 78 which may be made of high-grade steel. Support rings 74, 76 and 78 are shrunk onto pressure vessel 72 and to each other to provide the tightest interference fit. Also, it has been found desirable to provide a slight angular taper between the various members, as shown in FIG. 3.

Piston 46 fits into the lower end of reaction chamber 44 in high-pressure plate 42. Again, it is desirable to construct piston 46 from the material capable of withstanding the highest compressive forces, such as tungsten carbide. In operation, piston 46 is advanced into reaction chamber 44 by piston pusher 52, as was described in detail in FIG. 3 above, until one end of piston 44 contacts the end of a reaction vessel 80, to provide high-pressures on reaction vessel 80, shown schematically in FIG. 3 and described in more detail in FIG. 5 below, to effect the conversion of graphite to diamond in reaction vessel 80. The second end of piston 46 projects out of reaction chamber 44 and is contacted by piston pusher 52, as described above.

Binding rings 82 and 84 are provided around piston 46. Binding ring 82 always stays around the second end of piston 46 and binding ring 84 in friction fitted around the body of piston 46 and slides along piston 46 as the piston 46 traverses into reaction chamber 44. The function of binding rings 82 and 84 is described in detail in connection with the description of FIG. 4 below.

FIG. 3 also shows electrical insulating member 86 positioned between upper end load plate 48 and high-pressure plate 42. Insulating member 86 is provided so that reaction vessel 80 may be electrically heated by applying a suitable potential between upper end load plate 48 and piston pusher 52. More details of the electrical heating manner are shown in connection with FIG. 5 below.

As was mentioned, both cylinder 46 and pressure vessel 72 are preferably made from cemented tungsten carbide, which is one of the hardest materials presently known. However, even tungsten carbide has difficulty withstanding the pressures of the magnitude shown in the phase diagram of FIG. 1. Pressure vessel 72 can be reinforced with interference fitting steel rings, as is shown in FIG. 3, but obviously this approach cannot be taken with piston 46, since it must be free to move into reaction chamber 44. Thus, piston 46 itself must withstand pressures in the magnitude of 50 to 70 kilobars, or some means must be employed to enable it to do so. The best available tungsten carbide pistons are claimed by their manufacturer to be able to withstand a pressure of only about 47 kilobars, and the pistons so obtainable usually do rupture when subjected to pressures of this order. Thus, it is seen that some means must be employed to strengthen the pistons to withstand substantially higher pressures while still allowing them to tranverse further into reaction chamber 44 when the graphite to diamond conversion occurs to compensate for the resulted decrease in volume.

One approach which has proven to be satisfactory is to provide binding rings 82 and 84 on piston 46. As is shown in FIG. 3, binding ring 82 is positioned with an interference fit around the second end of piston 46 adjacent to piston pusher 52. Binding ring 84 is positioned with a friction fit around the body of piston 46 and is initially placed near the top of piston 46. As piston 46 enters reaction chamber 44, binding ring 84 is restrained by the bottom of high-pressure plate 42 and slides along the side walls of piston 46 as it enters reaction chamber 44.

FIG. 4 shows graphically the effect of binding rings 82 and 84 on the crushing strength of a cemented tungsten carbide piston 46. The curve therein plots the crushing strength in kilobars as a function of the ratio of the unsupported length to the diameter of the piston. "Unsupported length" means the length between binding rings 82 and 84. It is seen that the use of the binding rings dramatically increases the crushing strength of the piston and if binding rings are employed to provide an effective length to diameter ratio of the unsupported piston of one or less, a crushing strength in excess of sixty kilobars can easily be obtained.

Prior reports on the crushing strength of cemented tungsten carbide pistons can be found in an article by Kennedy and Haygarth entitled "Crushing Strength of Cemented Tungsten Carbide Pistons" appearing in The Review of Scientific Instruments, vol. 38, No. II, 1590–1592, November 1967.

FIG. 5 shows a cross sectional view of a reaction vessel 80 which may conveniently be used with the high-pressure apparatus of FIGS. 2 and 3 to hold the graphite charge which is to be converted into diamond. As shown therein, reaction vessel 80 includes an outer cylinder 82, which is preferably made from a hydrogen-free material such as sodium chloride, and an inner cylinder 84 which is made from Pyrex glass. An inner graphite sleeve 86 is provided which is the electrical heater element for heating the charge to the desired high temperature. Each end of reaction vessel 80 is closed by an end plug 88, which is electrically conductive and which serves as an electrical lead to graphite heater 86. Insulator rings 90 are provided to prevent end plugs 88 from shorting out against the side walls of reaction chamber 44.

During the experiments which led to the present invention, it was observed that, for reasons not yet understood, the presence of hydrogen in reaction chamber 44 is very detrimental to the conversion of graphite into diamond. For this reason, the outer cylinder 82 of reaction vessel 80 is constructed from sodium chloride, or pressed salt, or any other suitable anhydrous material even though this material is harder to handle than a material such as talc. The problem with talc is that it is $MgO.SiO_2.H_2O$. When the talc is subjected to the high temperatures and pressures within reaction chamber 44, the water of crystallization is broken apart and the water is broken down into its hydrogen and oxygen components, thus liberating hydrogen into the reaction chamber. For unknown reasons, this hydrogen so liberated greatly impedes the formation of diamonds.

The term "anhydrogenous" may be used to describe a material which contains no hydrogen in its composition, either as free hydrogen or as an element in a hydrogen-containing compound. Using the term so defined, it has been found that reaction vessel 80 should be formed entirely from anhydrogenous material.

Also, in order to maintain a hydrogen free reaction chamber, it was discovered that hydrogen-containing lubricants should not be used in the reaction chamber area. In the piston-cylinder apparatus of FIGS. 2 and 3, it is necessary to provide as close a tolerance as possible between the outer diameter of piston 46 and the inner diameter of reaction chamber 44. In this general type of cylinder-piston high pressure apparatus, in order to reduce the friction between the piston and the cylinder, it is customary to lubricate it with a lubricant such as molybdenum disulfide. This lubricant itself does not contain hydrogen, but it is usually dissolved in a hydrocarbon grease to be coated on the walls. It has been found that greatly improved results are obtained if the molybdenum disulfide is instead dissolved in a fluorocarbon base such as perfluorated kerosine before being coated on the walls of the piston and cylinder. Thus, all materials present in the reaction chamber are selected to be anhydrogenous.

The apparatus used in accordance with the present invention to convert graphite to diamond has thus been described in detail. Consider now the manner in which this apparatus is operated to effect the conversion. A mixture of graphite and of the material to be used as a solvent is placed in reaction vessel 80 of FIG. 6. For example, the solvent may be any carbon solvent listed in Hansen, Constitution of Binary Alloys, McGraw-Hill Book Co. (1958), such as the iron-nickel alloy discussed above, and the proportions of the solvent to graphite may be 20% to 80%. This mixture, termed the charge, is placed inside the anhydrous reaction vessel 80 and the end plugs 88 are placed upon it. Reaction vessel 80 is then placed in reaction chamber 44 of the apparatus 40 of FIGS. 2 and 3. The walls of chambers 44 and 46 are then lubricated with molybednum sulfide suspended in perfluorated kerosene and then piston 46 is inserted into reaction chamber 44 until reaction vessel 80 is tightly confined between upper end load plate 48 and one end of piston 46. The charge is then heated by applying an electrical potential between upper end load plate 48 and piston pusher 52, thus supplying electrical current to graphite heater 86 through end plugs 88 of reaction vessel 80. The hydraulic rams 54 and 62 are then actuated. The charge within reaction vessel 80 is thus heated and subjected to high-pressures.

Continuing the description of the operation of the apparatus in accordance with the invention, reference is now made to FIG. 6, which is a pressure-temperature phase diagram of carbon similar to that shown in FIG. 1. Shown therein is the equilibrium line 1 and the phase boundary line 2, as was described in detail in connection with the description of FIG. 1 above. Again, the curve 5–3–6 defines the diamond growing region 4.

Pressure and temperature are applied to the charge in the reaction vessel 80 in the manner described above until a point 92 is reached which lies to the right of phase boundary line 2 but beneath equilibrium line 1. At this point the solvent and the graphite are both in their liquid phase and the graphite is dissolved in the solvent. However, since point 92 lies below equilibrium line 1, the carbon remains in the graphite phase. Pressure is now increased by further actuating hydraulic ram 54 until the point 94 is reached just above equilibrium line 1 in diamond growing region 4. At this point, the conditions are appropriate for converting graphite into diamond and such a conversion occurs.

It has been found that by placing point 94 just above equilibrium line 1, only a few relatively large diamonds will be formed from the charge rather than a large number of relatively small diamonds. Dramatically improved results are obtained if the pressure at point 94 is limited to no more than .1 kilobar above equilibrium line 1. It is believed that the reason for this is that at a point quite near or practically on equilibrium line 1, initial growth begins quite slowly and a small number of diamonds begin crystallizing. As these conditions are maintained for a period of time, additional graphite is converted to diamond, and this additional conversion occurs around the initially formed diamonds, which may be thought of as seeds. If these conditions are maintained for a long enough period of time, practically all of the graphite will be converted to diamond and a small number of seeds will grow into relatively large diamonds. In practice, diamonds of over one carat have been made in this manner.

In contrast to this, if the pressure is increased to a point far into the diamond growing region 4 many small diamonds are formed because the conditions are so far into the diamond growing region that diamond conversion occurs simultaneously all through the charge, rather than in only a few locations at first, and thus the seed effect described above does not occur.

Continuing now the description of the operation of the present invention, as diamond conversion occurs at point 94, the volume of the charge decreases abruptly, because of the above mentioned increase in density of the carbon as conversion occurs. To compensate for this, piston 46 is advanced further into reaction chamber 44 to reduce its volume while maintaining the same pressure. It is primarily this feature and the ability to effect this result that provides the great advances of this invention over the prior art. After the charge has been maintained at the point 94 for a sufficient period of time, typically about 30 minutes for a charge of about 10 grams, the temperature is then reduced by reducing the current through the electrical heater while maintaining the pressure at substantially the same level until the point 96 is reached which is to the left of phase boundary line 2.

This sequence is followed in order that the diamonds are not reconverted back to graphite. After the point 96 is reached, the temperature and pressure may be reduced to room temperature and pressure and the now diamond bearing charge withdrawn from the reaction vessel.

While the invention is thus disclosed and the preferred embodiment described in detail, it is not intended that the invention be limited to this shown embodiment. Instead many modifications will occur to those skilled in the art which lie within the spirit and scope of the invention. Accordingly, it is intended that the invention be limited only by the appended claims.

What is claimed is:

1. A method of manufacturing diamond from graphite in a hydrogen free environment, which comprises the steps of:

(a) forming a reaction vessel from an anhydrogenous material;
   (b) placing a charge of graphite and a carbon solvent in said reaction vessel;
   (c) placing said reaction vessel in a reaction chamber;
   (d) placing a plunger in said reaction chamber to generate high pressure therein;
   (e) lubricating the relatively moving surfaces of said reaction chamber and said plunger with an anhydrogenous lubricant;
   (f) raising the pressure and temperature in said reaction chamber until the pressure and temperature conditions in said reaction chamber are above the diamond-graphite equilibrium line of the carbon phase diagram; and (g) maintaining said pressure and temperature conditions for a predetermined time period until at least a portion of said graphite is converted to diamond.

2. The method of claim 1 in which said reaction vessel is formed from an anhydrous salt.

3. The method of claim 2 in which said anhydrous salt is sodium chloride.

4. The method of claim 1 in which said reaction vessel is formed from glass.

5. The method of claim 1 in which said anhydrogenous lubricant is molybdenum sulfide suspended in a fluorocarbon base.

6. The method of claim 5 in which said fluorocarbon base is perfluorated kerosene.

References Cited

UNITED STATES PATENTS 3,407,445   10/1968   Strong _____ 23—209.1 X
3,130,158   4/1964   Daly _____ 252—25

OTHER REFERENCES

Haygarth et al. "J. Applied Physics," vol. 38, No. 12, November 1967, pp. 4557–4564.

Giardini et al. "The American Mineralogist," vol. 47, November-December 1962, pp. 1393–1396.

EDWARD J. MEROS, Primary Examiner

U.S. Cl. X.R.

252—25